United States Patent [19]

Snodgrass et al.

[11] 4,444,740

[45] Apr. 24, 1984

[54] METHOD FOR THE RECOVERY OF FLUORIDES FROM SPENT ALUMINUM POTLINING AND THE PRODUCTION OF AN ENVIRONMENTALLY SAFE WASTE RESIDUE

[75] Inventors: John B. Snodgrass; Edward L. Cambridge, both of Tucson, Ariz.

[73] Assignee: Atlantic Richfield Company, Los Angeles, Calif.

[21] Appl. No.: 466,159

[22] Filed: Feb. 14, 1983

[51] Int. Cl.$^3$ .............................................. C01F 7/04
[52] U.S. Cl. ................................. 423/483; 423/111; 423/119; 423/185; 423/482; 423/484; 423/485; 423/489
[58] Field of Search ............... 423/482, 483, 484, 485, 423/111, 119, 489, 185

[56] References Cited

U.S. PATENT DOCUMENTS

| | | | |
|---|---|---|---|
| 3,073,676 | 1/1963 | Mollard et al. | 23/153 |
| 3,198,600 | 8/1965 | Mollard et al. | 23/88 |
| 3,808,322 | 4/1974 | Lam et al. | 423/185 |
| 3,878,294 | 4/1975 | Schabacher et al. | 423/485 |
| 4,006,066 | 2/1977 | Sparwald | 204/67 |
| 4,052,288 | 10/1977 | Sala | 204/243 |
| 4,053,375 | 10/1977 | Roberts et al. | 423/111 |
| 4,065,551 | 12/1977 | Dahl | 423/483 |
| 4,113,831 | 9/1978 | Orth, Jr. et al. | 423/119 |
| 4,113,832 | 9/1978 | Bell et al. | 423/489 |
| 4,158,701 | 6/1979 | Andersen et al. | 423/119 |
| 4,160,808 | 7/1979 | Andersen et al. | 423/489 |
| 4,160,809 | 7/1979 | Andersen et al. | 423/489 |
| 4,238,469 | 12/1980 | Schmidt et al. | 423/489 |
| 4,294,816 | 10/1981 | Kruger et al. | 423/484 |
| 4,310,501 | 1/1982 | Reh et al. | 423/484 |
| 4,355,017 | 10/1982 | Gamson et al. | 423/483 |

OTHER PUBLICATIONS

*Light Metals,* 1981, Recovery of Fluoride and Fluorine Balance of Aluminum Smelting Plant, H. Mizuno, N. Ono and S. Tozawa, pp. 407–419.

*Primary Examiner*—Arthur P. Demers

[57] ABSTRACT

A method for recovery of fluoride values from spent potlining and fluoride containing insulating materials associated with the potlining is disclosed. Spent potlining and the insulating materials are reduced to a fine particle size and incinerated. The ash residue is leached with a dilute caustic and the leachate is treated with a calcium compound to precipitate calcium fluoride. The calcium fluoride is dried to a moisture content of less than 0.1 percent and is treated with about 93 to 99 percent concentration of sulfuric acid to produce hydrogen fluoride gas and a metal sulfate. The hydrogen fluoride gas is fed into an alumina dry scrubber to produce alumina with absorbed fluorides to be used as feed material to reduction cells used in the manufacture of aluminum by electrolytic reduction. The metal sulfate residue is treated with lime and constitutes an environmentally safe product which can be disposed of as landfill material.

17 Claims, 1 Drawing Figure

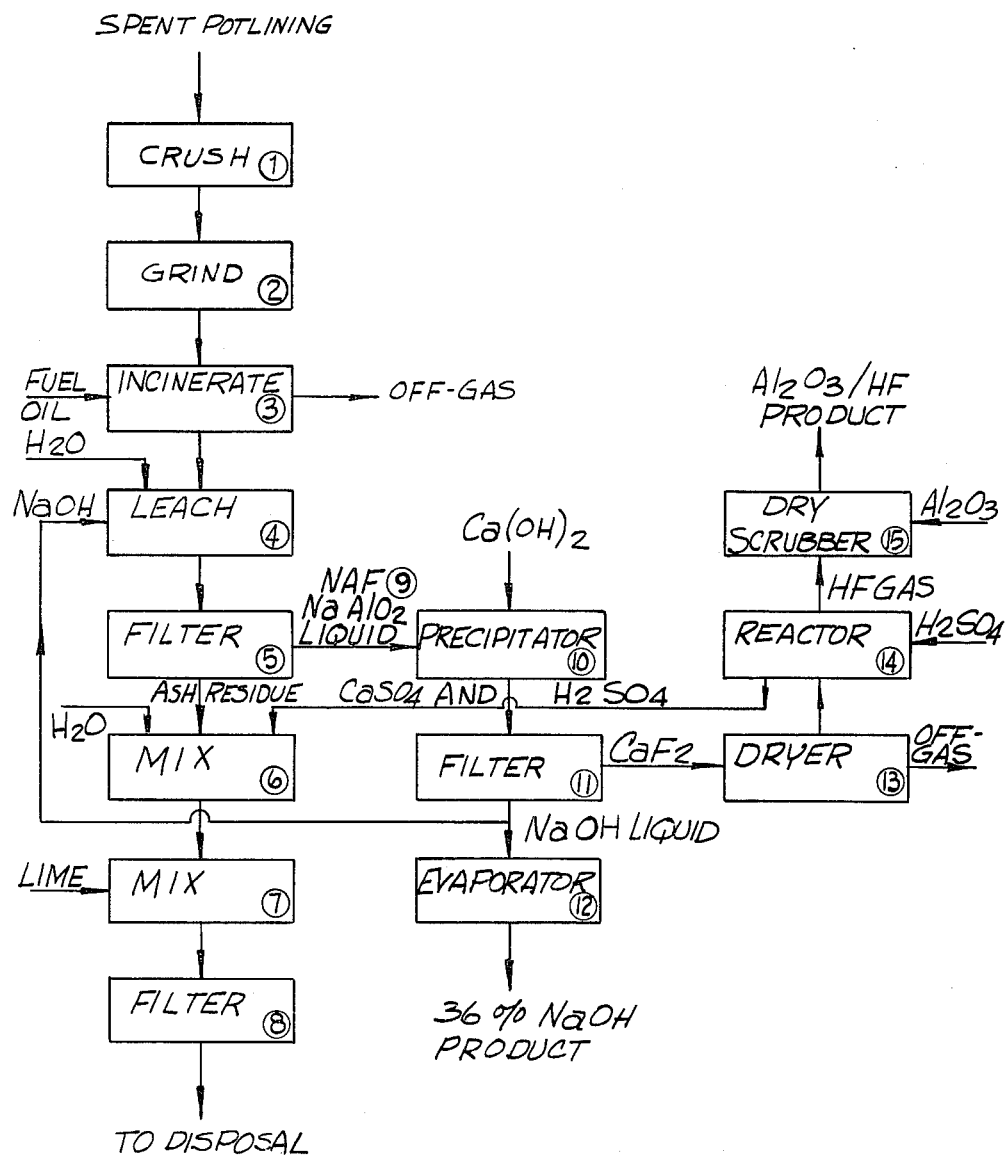

METHOD FOR THE RECOVERY OF FLUORIDES FROM SPENT ALUMINUM POTLINING AND THE PRODUCTION OF AN ENVIRONMENTALLY SAFE WASTE RESIDUE

FIELD OF THE INVENTION

This invention relates to a method for the recovery of fluoride values from spent potlining and any fluoride containing insulating materials associated therewith and wherein the residual waste material is an environmentally safe residue which can be disposed of as landfill material.

BACKGROUND OF THE INVENTION

A conventional method for the manufacture of aluminum is by electrolysis of reduction grade $Al_2O_3$ and utilizes a reduction pot which is lined on its side and bottom with a carbonaceous material. The reduction of $Al_2O_3$ in a pot of this nature is carried out at temperatures of about 950° to 980° C. During the life of the pot, the carbonaceous material is gradually destroyed by penetration of the materials being reduced in the pot and the natural aging of the material due to its operational requirements. Finally, a pot will deteriorate to such a degree that further use of the pot is not economically feasible and must be replaced. The spent potlining may contain as much as 25 to 35 percent by weight of fluorine. Since a commercial aluminum reduction plant generates on the average of 74 pounds of spent potlining per annual ton of aluminum produced, it is clear that it is desirable to recover the fluorine in the potlining. In view of this, it is not surprising that many processes have been developed throughout the past years for recovering the fluorine from the spent potlining.

In U.S. Pat. No. 3,808,322 there is disclosed a process for making sodium fluoferrate from the sodium fluoride, NaF, obtained by processing spent potlining. In the process of this patent, spent potlining is subjected to a size reduction, calcined at 650°–900° C. with subsequent leaching with water, and the leachate is freed of residual impurities by adjustment of its pH to about 8.9–9.0. The remaining leachate is a substantially pure NaF solution which is then used to make sodium fluorferrate, $Na_3FeF_6$.

Various processes for recovering the fluroine from the spent potlining using pyrohydrolysis are disclosed in U.S. Pat. Nos. 4,113,832; 4,158,701 and 4,294,816. In these processes, spent potlining and other materials, including in one instance floor sweepings, are crushed and subjected to pyrohydrolysis wherein a chemical reaction takes place. Fluoridic values such as NaF and HF can be recovered from the off gases and alumina and $Na_2O$ values are recovered from the solid residue. In the '701 patent, the off gases are contacted in a dilute phase fluidized zone with a source of $Al_2O_3$ to remove residual Na values and produce Na-free HF. One problem associated with the processes using pyrohydrolysis is that the reaction temperatures are such to cause the fluoride compounds to melt and coat the carbon so that it cannot burn. On subsequent solid/gaseous separation, the fluorides remain with the carbon. Additionally, rich silica levels from insulating brick, if present in the potlining, may carry over with the off gas, requiring further processing for silica removal.

An article in *Light Metals*, 1981, entitled "Recovery of Fluoride and Fluorine Balance of Aluminum Smelting Plant" describes the processing of spent potlining wherein the potlining is crushed, incinerated and introduced to a crusher for pulverizing and extraction of the fluorides into water. After filtration, the material is introduced into a mixing tank into which is added sulfuric acid and calcium carbonate to produce calcium fluoride. The slurry is desiccated and the sludge is sent to a disposal site. The fluorides-containing filtrate is used as the scrubbing solution in a wet-scrubber.

U.S. Pat. No. 4,113,831 discloses a process wherein the spent potlining is leached with a caustic solution followed by precipitation of sodium fluoride by saturating the leach liquor with a compound which suppresses the solubility of the sodium fluoride in the leach liquor. The preferred compound is ammonia. The precipitated sodium fluoride is removed and the leach solution saturated with ammonia is processed to remove the ammonia.

It is an object of this invention to provide a relatively inexpensive method for the recovery of fluoride values from spent aluminum potlining in a form suitable for recycling to aluminum reduction cells.

It is another object of this invention to provide a relatively inexpensive method for the recovery of fluoride values from spent aluminum potlining and any fluoride containing insulating materials associated therewith in a form suitable for recycling to aluminum reduction cells.

It is a further object of this invention to provide a relatively inexpensive method for the recovery of fluorides from spent aluminum potlining in a form suitable for recycling to aluminum reduction cells wherein the remaining residue is environmentally safe and can be disposed of as landfill material.

BRIEF SUMMARY OF THE INVENTION

The foregoing objects are accomplished by this invention which discloses a method wherein spent potlining and any other materials associated therewith, such as the insulating material used with the potlining, are ground to a size less than 1 mm. The ground materials are incinerated at about 650° C. to about 850° C. to destroy cyanides and at the same time substantially limit the amount of fluorides that volatize. Most of the carbon is combusted, reducing the net energy requirement. The ash residue is leached with water or a dilute caustic and the solid residue is separated from the leachate by filtration. The solid residue is mixed with dilute sulfuric acid to remove the residual fluorides and treated with a calcium source to convert the fluorides to insoluble calcium fluoride. The leachate is treated with a calcium compound to precipitate calcium fluoride which is treated with a high percentage sulfuric acid to produce hydrogen fluoride gas and a metal sulfate which is environmentally safe for disposal. The hydrogen fluoride gas is treated by alumina by scrubbing and the mixture of alumina and collected fluoride values are directly employed as feed to the reduction pots.

BRIEF DESCRIPTION OF THE DRAWING

The foregoing and other objects, features and advantages of the invention will be apparent from the following more particular description of preferred embodiments in relation to the drawing which comprises one sheet and is a flow diagram for the recovery of valuable materials from spent potlining and materials associated therewith and at the same time resulting in an environmentally safe residue which can be used as a landfill.

DETAILED DESCRIPTION OF THE INVENTION

Referring to the drawing, the present invention presents an integrated method for the recovery of valuable materials from spent potlining and the fluoride containing materials associated therewith such as the insulating materials used with the potlining. In the first step, the potlining and the fluoride containing materials associated therewith are crushed 1 and ground 2 to a fine particle size, preferrably less than 1 mm. The crushed and ground materials are fed into an incinerator 3 where they are incinerated at temperatures which will destroy any cyanides present, but will minimize the volatilization of the fluorides. Combustion of carbon provides the majority of fuel required for incineration. In the preferred embodiment, the temperature in the incineration is between about 650° C. and about 950° C. and more preferably between about 730° C. and about 850° C. At these temperatures, less than 20 percent of the carbon remains and in most instances less than 5 percent of the carbon remains. Also, at these temperatures less than 6 percent of the original fluoride content volatilizes and in most instances less than 3 percent of the original fluroide content volatilizes. The principle chemical reactions are the oxidation of carbon to form carbon dioxide and the decomposition of cyanides.

The ash residue is leached 4 with water or dilute caustic at ambient or superatmospheric pressures. The liquid to solids ratio is greater than 6:1 and in the preferred embodiment is from about 8:1 to about 15:1. The temperature at which the leaching is carried out is between about 20° C. and about 120° C. In the most preferred embodiment, the liquid comprises a dilute solution of about 2 percent of sodium hydroxide, NaOH, in a ratio of from about 10:1 to about 14:1. The leaching is done at pressure of from about 1 atmos to about 5 atmos and at a temperature between about 75° C. and about 100° C. and continued for a time period of from about 10 minutes to 3 hours. The principle chemical reaction is $Na_3AlF_6 + 4NaOH = 6NaF + NaAlO_2 + 2H_2O$. The leached solid residue is separated from the liquid by filtration 5.

The leached solid residue is mixed 6 with dilute sulfuric acid to remove any residual fluorides and subsequently treated with a calcium source 7 to convert the fluorides to insoluable calcium fluoride, $CaF_2$. The sulfuric acid has a concentration of from about 2 percent to about 10 percent. In the preferred embodiment, the calcium source comprises calcium hydroxide, $Ca(OH)_2$. The solid residue, including $CaF_2$ is separated 8 and sent to a disposal site.

The first leachate 9, NaF and $NaAlO_2$ plus $H_2O$, is treated 10 with a calcium compound, such as calcium hydroxide or calcium oxide, to precipitate an impure calcium fluoride. In the preferred embodiment, the calcium compound is calcium hydroxide, $Ca(OH)_2$. The principle chemical reaction is $2NaF + Ca(OH)_2 = CaF_2 + 2NaOH$. The solids are separated from the liquor by filtration 11 and then dried 13 to a moisture content of less than about 0.1 percent.

The solid product, $CaF_2$, is treated 14 with sulfuric acid having a concentration of about 93 percent to about 99 percent to produce a hydrogen fluoride gas and a metal sulfate. The principle chemical reaction is $CaF_2 + H_2SO_4 = 2HF + CaSO_4$. The calcium sulfate, $CaSO_4$, after mixing with lime, is an environmentally safe residue which can be disposed of as landfill material. The hydrogen fluoride gas is fed into an alumina dry scrubber 15 and the fluoride values are absorbed onto the alumina which is then employed as feed to the reduction pots. No further gas cleaning is required beyond this.

Some of the sodium hydroxide, NaOH, from the filtration 11 may be recycled to the first leaching operation 4. The remaining hydroxide solution is concentrated to about 36 percent NaOH by evaporation 12 and disposed off as a chemical product.

While the preferred embodiments of the invention have been described herein, the invention may be otherwise embodied and practiced within the scope of the following claims.

What is claimed is:

1. A method for producing a product capable of use as a feed material to a reduction cell used in the manufacture of aluminum by electrolytic reduction by recovering fluoride values from spent potlining of said cell comprising:
   (a) reducing a carbon-containing spent potlining to a fine particle size;
   (b) incinerating said fine particles of potlining to destroy any cyanides which may be present in said potlining and form an ash residue, said carbon providing a substantial portion of the fuel required for incineration;
   (c) leaching said ash residue to remove fluorides therefrom;
   (d) treating said flurorides to form a hydrogen fluoride gas;
   (e) feeding said hydrogen fluoride gas to an alumina dry scrubber to produce a product; and
   (f) using said product as feed material to a reduction pot used to produce aluminum.

2. A method as in claim 1 and further comprising:
   (g) also reducing fluoride containing insulating materials associated with said potlining to a fine particle size.

3. A method as in claim 1 wherein said fine particle size is less than 1 mm.

4. A method as in claim 3 wherein said incineration is at temperatures from about 650° C. to about 950° C.

5. A method as in claim 1 wherein the leaching solution for step (c) comprises water.

6. A method as in claim 1 wherein the leaching solution for step (c) comprises a dilute sodium hydroxide solution.

7. A method as in claim 6 and further comprising:
   (h) removing said fluorides of step (c) by filtration as a first leachate; and
   (i) treating said first leachate with a calcium compound to precipitate calcium fluoride.

8. A method as in claim 7 wherein said calcium compound comprises calcium hydroxide.

9. A method as in claim 7 and further comprising:
   (j) treating said calcium fluoride with sulfuric acid to produce hydrogen fluoride gas.

10. A method as in claim 9 wherein said sulfuric acid has a concentration of between about 93 and about 99 percent.

11. A method as in claim 10 wherein said calcium fluoride is dried to a moisture content of less than about 0.1 percent prior to said treating with sulfuric acid.

12. A method as in claim 11 wherein said treating said calcium fluoride with sulfuric acid also produces a metal sulfate which after treatment with lime is an environmentally safe residue which can be disposed of as landfill material.

13. A method as in claim 9 and further comprising:
(k) feeding said hydrogen fluoride gas to an alumina dry scrubber to produce alumina with absorbed fluoride values for use as feed material to a reduction cell used to produce aluminum.

14. A method as in claim 13 and further comprising:
(l) also reducing fluoride containing insulating material associated with said potlining to a fine particle size.

15. A method as in claim 6 and further comprising:

(g) removing a solid residue having residual fluorides by filtration of step (c); and
(h) mixing said solid residue with dilute sulfuric acid and treating with a calcium source to convert the fluorides to insoluble calcium fluoride.

16. A method as in claim 15 wherein said calcium source is calcium hydroxide.

17. A method as in claim 7 and further comprising:
(j) said treating of said first leachate with a calcium compound also produces a sodium hydroxide solution which may be partially recycled; and
(k) evaporating the remaining said sodium hydroxide solution to form a concentrated caustic solution for disposal as a chemical product.

* * * * *